(12) United States Patent
Spooner

(10) Patent No.: US 6,363,192 B1
(45) Date of Patent: Mar. 26, 2002

(54) COMPOSITE CABLE UNITS

(75) Inventor: John A. R. Spooner, Victoria (CA)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/220,268

(22) Filed: Dec. 23, 1998

(51) Int. Cl.[7] .............................. G02B 6/44; H01B 11/02
(52) U.S. Cl. ....................... 385/101; 385/102; 385/104; 385/113; 385/114; 174/115; 174/117 F
(58) Field of Search ................................ 385/101, 102, 385/103, 105, 106, 107, 114, 113; 174/110 R, 113 R, 115, 117 R, 117 F

(56) References Cited

U.S. PATENT DOCUMENTS

| | | | | |
|---|---|---|---|---|
| 4,000,416 A | * | 12/1976 | Goell | 385/127 |
| 4,449,012 A | | 5/1984 | Voser | 174/70 A |
| 4,467,138 A | * | 8/1984 | Brorein | 174/115 |
| 4,468,089 A | * | 8/1984 | Brorein | 385/114 |
| 4,725,110 A | * | 2/1988 | Glenn et al. | 385/100 |
| 4,763,983 A | * | 8/1988 | Keith | |
| 4,952,020 A | * | 8/1990 | Huber | 385/114 |
| 5,039,195 A | | 8/1991 | Jenkins et al. | 385/101 |
| 5,136,683 A | * | 8/1992 | Aoki et al. | 385/141 |
| 5,189,718 A | | 2/1993 | Barrett et al. | 385/101 |
| 5,371,823 A | | 12/1994 | Barrett et al. | 385/101 |
| 5,408,560 A | * | 4/1995 | Seynhaeve et al. | 385/101 |
| 5,442,722 A | * | 8/1995 | DeCarlo | 385/114 |
| 5,602,953 A | * | 2/1997 | Delage et al. | 385/101 |
| 5,651,081 A | * | 7/1997 | Blew et al. | 385/101 |
| 5,668,912 A | * | 9/1997 | Keller | 385/100 |
| 5,673,352 A | * | 9/1997 | Bauer et al. | 385/114 |
| 5,681,179 A | | 10/1997 | Lane | 439/393 |
| 5,734,126 A | * | 3/1998 | Siekierka et al. | 174/113 R |
| 6,064,789 A | * | 5/2000 | Mills | 385/114 |

FOREIGN PATENT DOCUMENTS

| | | | | |
|---|---|---|---|---|
| EP | 0 545 622 A1 | 6/1993 | ............ | H01B/7/18 |
| EP | 0 418 094 B1 | 12/1995 | ............ | G02B/6/44 |
| JP | 8-62461 | 3/1996 | ............ | G02B/6/44 |

OTHER PUBLICATIONS

JP-A-08062461; Mar. 8, 1996; Patent Abstracts of Japan.
Siecor Cable Product Code Guidebook; pp. 24 and 26; Jul. 1997.

* cited by examiner

Primary Examiner—Hemang Sanghavi
(74) Attorney, Agent, or Firm—Timothy J. Aberle

(57) ABSTRACT

A composite cable unit having an optical sub-unit including at least one optical fiber, and an electrical sub-unit including at least one electrical conductor for power or transmission. The optical and electrical sub-units are removably connected together by a common jacket material. The composite cable unit can be used singly or in, for example, fan-out or break-out cables.

29 Claims, 1 Drawing Sheet

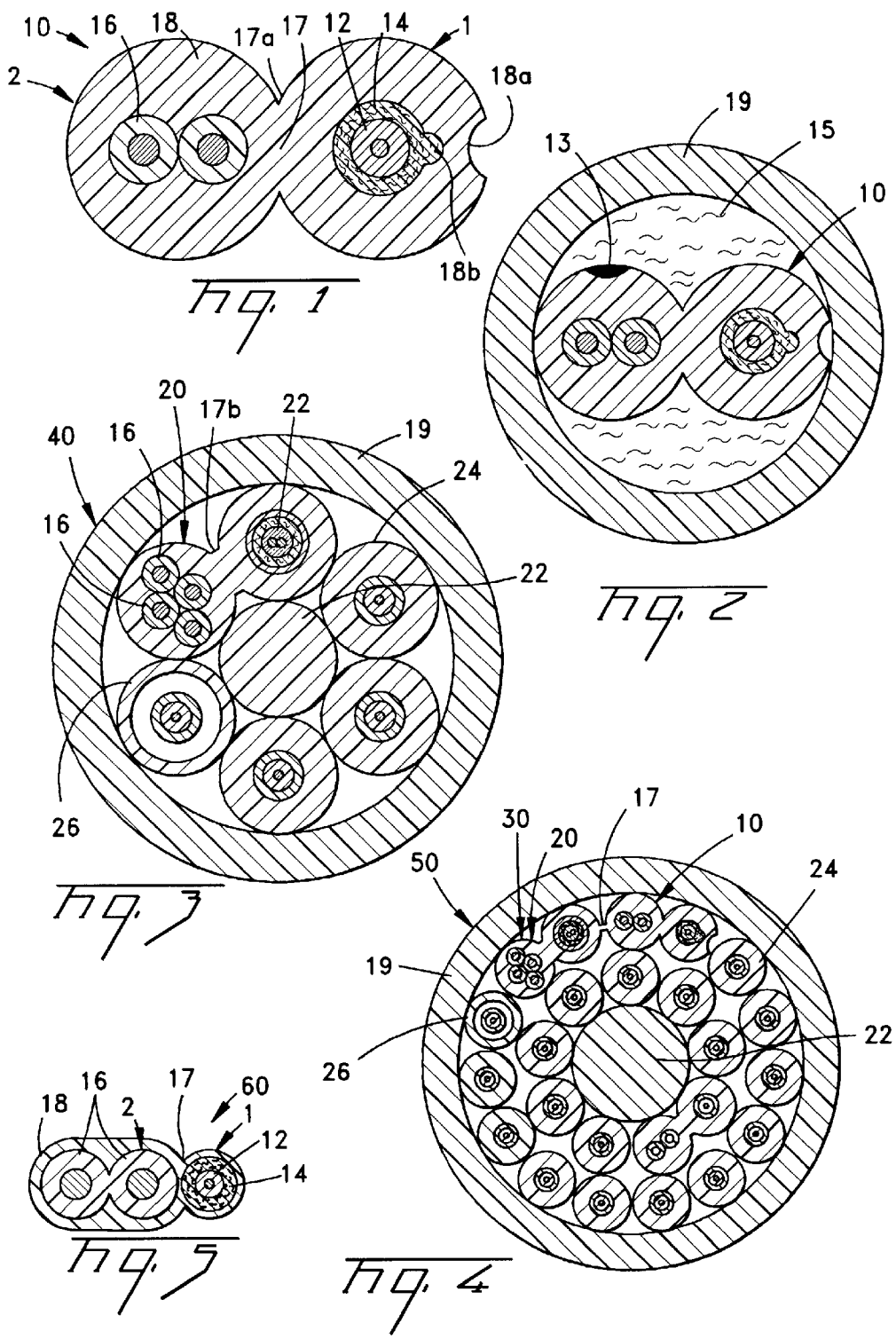

COMPOSITE CABLE UNITS

The present invention relates to composite cables having combined optical and electrical power and/or transmission capabilities.

Conventional fiber optic cables include optical fibers that conduct light which is used to transmit voice, video, and data information. Conventional composite cables combine the advantages of optical transmission components, e.g., large bandwidth and low power loss, with the advantages of electronic/electrical transmission components which include low cost and straightforward termination procedures. Typical applications for composite cables include fiber-to-the-curb (FTTC), fiber-to-the-home (FTTH), fiber-to-the-desk (FTTD), plenum, riser, and local area networks (LANs). In a premises environment, composite cables can be used to interconnect hardware, for example, computers and telephones.

A conventional cable design is illustrative of transmission electrical cables. U.S. Pat. No. 5,681,179 discloses a conventional electrical zip cord with stranded electrical conductors only. The zip cord can be terminated with an electrical connector with relative ease, but the cable does not include optical transmission components.

Conventional composite cables can include a row of optical fibers and a separate row of electrical conductors. For example, U.S. Pat. No. 5,039,195 discloses a composite cable with two distinct cable units. A first cable unit includes optical fiber sub-units connected to strength members by a common jacket having interconnecting web sections. A second cable unit includes metal conductors connected by a common jacket having interconnecting web sections. Both cable units are surrounded by a cable jacket.

As disclosed in U.S. Pat. No. 5,602,953, a composite cable can include a combination of loose-buffered optical fibers and electrical conductors in a common jacket. The common jacket defines a flat structure including box-shaped sub-units, apparently formed by an injection molding process, with twisted electrical leads and optical fibers disposed in buffer tubes. The cable is designed to be separated into the box-shaped sub-units.

OBJECTS OF THE INVENTION

It is an object of the present invention to provide a composite cable unit having an optical sub-unit including at least one optical fiber, and an electrical sub-unit including at least one electrical conductor. The optical and electrical sub-units are removably connected together by a common jacket material.

It is an object of the present invention to provide a fan-out cable having a central member with cable units therearound. At least one of the cable units comprises a composite cable unit, the composite cable unit including an optical sub-unit with at least one optical fiber, and an electrical sub-unit including at least one electrical conductor, the optical and electrical sub-units being removably connected together by a common jacket material.

BRIEF DESCRIPTION OF THE DRAWING FIGURES

FIG. 1 is a cross sectional view of a composite cable unit according to the present invention.

FIG. 2 is a cross sectional view of the composite cable unit of FIG. 1 surrounded by a protective sheath.

FIG. 3 is a cross sectional view of a fan-out cable having a composite cable unit according to the present invention.

FIG. 4 is a cross sectional view of a fan-out cable having a composite cable unit according to the present invention.

FIG. 5 is a cross sectional view of a composite cable unit according to the present invention.

DETAILED DESCRIPTION OF THE INVENTION

With reference to FIGS. 1–6, low-cost composite cable units 10,20,30, according to the present invention for use in, for example, FTTC, FTTH, FTTD, plenum, riser, or LAN applications will be described.

Skilled artisans will appreciate that, in light of the present disclosure, fan-out cables and composite cable units made according to the present invention can take various forms. For example, the present invention can be practiced as a composite cable unit 10 (FIG. 1) having an optical sub-unit 1 connected to an electrical sub-unit 2. Optical sub-unit 1 can include an optical fiber 12 therein, e.g., a 900 $\mu$m tight buffered optical fiber. Optical fiber 12 can be surrounded by a layer of strength filaments 14, for example, aramid or fiberglass fibers that de-couple optical fiber from a common jacket 18. Optical fiber 12 can include, for example, one or more single mode optical fibers, or one or more multi-mode or multi-core optical fibers. Electrical sub-unit 2 can include one or more electrical conductors 16, for example, a twisted pair of electrical conductors 16. Electrical conductors 16 may preferably be about 19 to 26 AWG or smaller.

Optical fiber 12 and electrical conductors 16 can be disposed within common jacket 18 formed of polyvinyl chloride (PVC), polyethylene (PE), a UV curable resin (e.g. acrylate), or a fluoro-compound. The material of jacket 18 can include one or more flame retardant additives, for example, tetrabromoethane, chlorinated paraffin, chlorinated polyethylene, tetrabromobisphenol A, and/or phosphate compounds. Inorganic flame retardant additives can be used as well, for example, magnesium compounds, antimony trioxide, and aluminum hydroxide. Flame retarding jacket 18 can be required for assuring satisfactory plenum (e.g. UL-910) or riser (e.g. UL-1666) cable burn performance characteristics. Sub-units 1,2 can be separably connected to each other by extrusion or welding portions of jacket 18 together. Alternatively, sub-units 1,2 can be connected by a frangible ligature 17 during extrusion of jacket 18. Ligature 17 can include separation areas 17a, 17b (FIGS. 1–3), for ease of separation of sub-units 1,2. Jacket 18 can also include access recesses 18a,18b for separating jacket 18 to gain access to optical fiber 12. Composite cable unit 10 can be surrounded by a layer of strength fibers 15 and a protective sheath 19 (FIG. 2). Sheath 19 can be formed of PVC, PE, or a fluoro-compound, any of which materials can include one or more flame retardant additives.

Further, the invention can be practiced in the form of a composite cable unit 20 (FIG. 3) having more than one twisted pair electrical conductors 16, and a multi-core optical fiber 22. Suitable exemplary multi-core optical fibers are disclosed in U.S. Pat. No. 4,000,416 and U.S. Pat. No. 5,222,172, both of which are incorporated by reference herein. Composite cable unit 20 can be part of a fan-out cable 40, and can be longitudinally disposed adjacent to, or helically (unidirectional) or SZ stranded about, a central member 22. Central member 22 can be, for example, a fiber or a glass reinforced plastic rod, or fibers impregnated with a polymeric resin. Composite cable unit 20 can be stranded with other fiber optic components, for example, tight buffered or loose buffered optical fiber components 24 or 26.

In addition, the invention can be practiced in the form of a composite cable unit 30 (FIG. 4), for example, having one or more composite cable units 10,20 joined together by a ligature 17. Composite cable unit 30 can be part of a fan-out cable 50 and can be stranded about a central member 22 along with other fiber optic components, for example, tight buffered or loose buffered optical fiber units 24,26. Moreover, the present invention can be practiced in the form of a composite cable unit 60 (FIG. 5) having a jacket 18 formed of a UV curable acrylate, PVC, polyurethane, or PE material. Cable 60 can be generally flat and can have one or more conductors 16 that may be used to, for example, conduct low voltage electrical power.

Sub-units 1, 2 can be formed with separate jacket layers 18 and then joined together by welding the portions of jacket 18 together. The conductors 16 can be overcoated with a jacket 18 such that the insulation of the conductors is separably adhered to jacket 18. Additionally, a controlled bond can be formed between jacket 18 and the insulation of conductors 16 by passing the conductors through, for example, a silicone bath or talc powder applicator prior to application of jacket 18. Electrical sub-unit 2 can be connected to sub-unit 1 by use of a heated knife apparatus that welds the sub-units together.

Alternatively, sub-units 1,2 of the present invention can be manufactured by passing the optical and electrical components through an extruder and extruding jacket 18 therearound. Prior to extrusion, filaments 14 can be coated with a talc powder to prevent sticking of jacket 18 to the filaments. The die profile can be shaped so that sub-units 1,2 have a generally round cross section, or other cross sectional shapes may be formed as well. The die can include a profile that will result in the formation of ligatures area 17a, 17b, and/or access recesses 18a,18b Ligature 17b can include a web thickness that is less than the outside diameter (OD) of at least one of the sub-units. Ligature 17b can space sub-units 1,2 apart a suitable distance for easy separability. The respective outside diameters of the sub-units need not be equal.

A craftsman can easily separate the sub-units as desired, remove a section of jacket 18, and connectorize/terminate the fibers and electrical conductors. Composite cable units of the present invention advantageously provide a combination of the benefits of optical and electronic/electrical functionalities.

The present invention has thus been described with reference to the foregoing embodiments, which embodiments are intended to be illustrative of the present inventive concepts rather than limiting. Persons of ordinary skill in the art will appreciate that variations and modifications of the foregoing embodiments can be made without departing from the scope of the appended claims. For example, electrical conductor 16 can be any suitable electrical transmission component, e.g., a co-axial cable or a non-twisted conductor. Filaments 14 can be small impregnated fibers or rods surrounding or adjacent to the optical fiber. Any of the composite cable units can be part of a break-out cable. Fan-out or break-out cables of the present invention can include strength filaments adjacent to the cable units. Where wavelength selection features are desired in the optical sub-unit, one or more periodic refractive indices can be written into the fiber before buffering, for example, as disclosed in U.S. Pat. Nos. 4,725,110, 5,620,495, 5,718,738, and/or 5,818,630, all of which are respectively incorporated by reference herein. For identification purposes, a craftsman may be able to distinguish between the optical and electrical sub-units without identification means; however, an identification means can be provided on either or both of the sub-units. The identification means can include different colors for the sub-units, one or more extruded or inked-on stripes 13 (FIG. 2), or any other suitable identification means. Fan-out cables according to the present invention can include fiber optic cable components, for example, ripcords or water blocking yarns. The optical sub-unit can include a buffer tube with one or more optical fibers therein.

Accordingly, what is claimed is:

1. A composite cable unit, comprising:
   an optical sub-unit including at least one optical fiber; an electrical sub-unit including at least one insulated electrical conductor;
   said optical and electrical sub-units being adjacent and removably connected together at a medial portion generally between said sub-units by a common jacket material, said common jacket material being separably overcoated on the insulation of said at least one electrical conductor; and
   said at least one optical fiber being generally surrounded by strength members or filaments that are operative to at least partially de-couple said at least one optical fiber from said common jacket.

2. The composite cable unit of claim 1, said at least one optical fiber being tight buffered.

3. The composite cable unit of claim 1, said at least one optical fiber including at least one periodic refractive index therein.

4. The composite cable unit of claim 1, said at least one electrical conductor being part of at least one twisted pair of electrical conductors.

5. The composite cable unit of claim 1, said common jacket material including at least one flame retardant additive.

6. The composite cable unit of claim 1, said common jacket material including a ligature connecting said sub-units.

7. The composite cable unit of claim 6, said ligature including separation area.

8. The composite cable unit of claim 6, said ligature comprising a web with a thickness that is less than an OD of at least one of the sub-units.

9. The composite cable unit of claim 1, said sub-units being separably welded together.

10. The composite cable unit of claim 1, said common jacket material including at least one access recess.

11. The composite cable unit of claim 1, said common jacket material including at least one identification means.

12. The composite cable unit of claim 1, said at least one optical fiber comprising a multi-core optical fiber.

13. The composite cable unit of claim 1, said cable unit being surrounded by a protective sheath.

14. The composite cable unit of claim 1, a controlled bond being formed between said common jacket material and said at least one electrical conductor.

15. The composite cable unit of claim 1, said jacket being applied in an extrusion process.

16. A fan-out cable comprising:
    a central member having cable units therearound;
    at least one of said cable units comprising a composite cable unit;
    said composite cable unit including an optical sub-unit with at least one optical fiber, and an electrical sub-unit including at least one electrical conductor, said optical and electrical sub-units being removably connected at a medial portion generally between said sub-units by a common jacket material; and
    said at least one optical fiber being generally surrounded by strength members or filaments that are operative to at least partially de-couple said at least one optical fiber from said common jacket.

17. The fan-out cable of claim 16, said composite cable unit being connected to at least one other composite cable unit.

18. The fan-out cable of claim 16, said composite cable being stranded with other cable units or components about said central member.

19. A composite cable unit, comprising:

an optical sub-unit including at least one optical fiber; an electrical sub-unit including at least one insulated electrical conductor;

said optical and electrical sub-units being removably connected together by a common jacket material, said common jacket material being separably overcoated on the insulation of said at least one electrical conductor; and said electrical sub-unit having a major cross-sectional dimension including a portion of said common jacket and said optical sub-unit having a major cross-sectional dimension including a portion of said common jacket, said major cross-sectional dimension of said electrical sub-unit being greater than said major cross-sectional dimension of said optical sub-unit.

20. The composite cable unit of claim 19, said at least one optical fiber being generally surrounded by strength members that de-couple said optical fibers from said common jacket.

21. A composite cable unit of claim 19, said common jacket material including at least one flame retardant additive.

22. A composite cable unit of claim 19, said common jacket material including a ligature connecting said sub-units.

23. A composite cable unit of claim 22, said ligature including a separation area.

24. A composite cable unit of claim 22, said ligature comprising a web with a thickness that is less that the OD of at least one of the sub-units.

25. A composite cable unit, comprising:

an optical sub-unit including at least one optical fiber; an electrical sub-unit including at least one insulated electrical conductor;

said optical and electrical sub-units being removably connected together by a common jacket material, said common jacket material being separably overcoated on the insulation of said at least one electrical conductor; and said at least one optical fiber being generally surrounded by strength members or filaments that are operative to at least partially de-couple said at least one optical fiber from said common jacket.

26. A composite cable unit of claim 25, said common jacket material including at least one flame retardant additive.

27. A composite cable unit of claim 25, said common jacket material including a ligature connecting said sub-units.

28. A composite cable unit of claim 27, said ligature including a separation area.

29. A composite cable unit of claim 27, said ligature comprising a web with a thickness that is less that the OD of at least one of the sub-units.

* * * * *